United States Patent [19]
Hansson et al.

[11] Patent Number: 5,246,315
[45] Date of Patent: Sep. 21, 1993

[54] CUTTING INSERT AND CUTTING TOOL FOR A PEELING OPERATION

[75] Inventors: Sölve Hansson; Yngve Dahllöf, both of Sandviken, Sweden

[73] Assignee: Sandvik AB, Sandviken, Sweden

[21] Appl. No.: 801,871

[22] Filed: Dec. 3, 1991

[30] Foreign Application Priority Data

Dec. 3, 1990 [SE] Sweden ............... 9003828

[51] Int. Cl.$^5$ .............. B23B 27/22; B23B 5/12
[52] U.S. Cl. .................... 407/114; 82/130; 407/116; 407/69
[58] Field of Search ......... 407/67, 99, 113, 114–116, 407/69; 82/130

[56] References Cited

U.S. PATENT DOCUMENTS

| | | | |
|---|---|---|---|
| 3,885,281 | 5/1975 | Stambler | 407/114 |
| 4,035,888 | 7/1977 | Romagnolo | 407/114 X |
| 4,214,847 | 7/1980 | Kraemer | 407/114 |
| 4,222,690 | 9/1980 | Hosoi | 408/230 |
| 4,486,127 | 12/1984 | Eckle | 407/114 |
| 5,096,338 | 3/1992 | Takahashi | 407/114 |

FOREIGN PATENT DOCUMENTS

| | | |
|---|---|---|
| 0112136 | 5/1984 | European Pat. Off. |
| 2734095 | 2/1978 | Fed. Rep. of Germany |
| 62-130107 | 6/1987 | Japan |

*Primary Examiner*—Steven C. Bishop
*Attorney, Agent, or Firm*—Burns, Doane, Swecker & Mathis

[57] ABSTRACT

A multi-cornered cutting insert includes a corner cutting edge at each corner, and a chipbreaking recess spaced inwardly of each corner cutting edge. The recess is curved as the insert is viewed in plan. A clearance face for each corner cutting edge has a clearance angle which progressively increases toward the respective corner.

23 Claims, 2 Drawing Sheets

CUTTING INSERT AND CUTTING TOOL FOR A PEELING OPERATION

BACKGROUND OF THE INVENTION

The present invention relates to a cutting insert and cutting tool for turning operations. More specifically the invention relates to a turning insert for a bar peeling operation performed on solid or hollow bars formed of stainless steel or other heat resistant materials. The insert has a polygonal form including an upper chip face, an opposite bottom face and a clearance face located therebetween, whereby the intersection of the chip face and the clearance face forms a cutting edge.

Bar peeling as a metalworking operation means that a non-rotatable bar is axially displaced through a central hole of a rotary cutter head. The cutter head is provided with several tools which remove from the bar a thin layer of millscale, surface cracks, etc., that results from the hot rolling of such bars or tubes. In order to achieve the best results regarding tolerances and surface finish, two different types of inserts, i.e., roughing and finishing inserts, are usually combined in the same holder. One of the most commonly used inserts for bar peeling is a so-called trigonal insert as shown and described in U.S. Pat. No. 4,035,888. That insert is in the form of a regular polygonal body the corners of which are configured symmetrically about a corner bisector. Such inserts, however, have somewhat limited utility because they do not enable desired results to be achieved in terms of tolerances and surface finish when large feeds are involved.

In view thereof, it is a purpose of this invention to provide a new type of insert with nonsymmetrically formed cutting corner portions which will satisfy close tolerance demands and enable good surface finish to be achieved, even at very high feeds.

It is another purpose of the invention to provide an insert with an extended lifetime.

It is yet another purpose of the invention to provide an insert which can more efficiently reduce the tendency for vibrations to occur during a metal cutting operation.

SUMMARY OF THE INVENTION

These and other objects of the invention are achieved by a cutting insert for bar peeling which comprises a multi-cornered polygonal bottom of wear resistant material. The body includes top and bottom surfaces and peripheral edge surface extending therebetween. The peripheral edge surface includes corner clearance faces disposed at respective corners of the body. The corner clearance faces intersect the top surface to form corner cutting edges. Each corner cutting edge is convexly curved as the top surface is viewed in plan. The top surface defines a chip face and includes chip breaker recesses located adjacent respective ones of the corner cutting edges. Each recess is spaced from its respective corner cutting edge in a direction toward a center of the insert. Each of the recesses is curved such that a near wall thereof located closest to the corner cutting edge is convex as the insert is viewed in plan, and a far wall thereof located farther from the corner cutting edge is concave as viewed in plan.

Preferably, each of the corner clearance faces extends at an acute clearance angle relative to the top surface, and the clearance angle preferably becomes progressively larger as a respective corner is approached.

The peripheral edge surface preferably includes side clearance faces which intersect the top face to form therewith side cutting edges.

An imaginary line extending perpendicularly from a side cutting edge and passing through a geometric center of the insert preferably intersects a respective one of the corner cutting edges such that a portion of the corner cutting edge disposed on one side of that line is longer than the remainder thereof located on the other side of the line.

Each of the recesses is preferably elongated so as to be longer in a direction generally parallel to its respective corner cutting edge than a direction generally perpendicular to its respective corner cutting edge.

In another aspect of the present invention, a tool for bar peeling comprises a tool holder on which are removably disposed a circular roughing insert and a finishing insert. The finishing insert is substantially triangular shaped with a curved corner cutting edge in each corner thereof.

BRIEF DESCRIPTION OF THE DRAWING

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
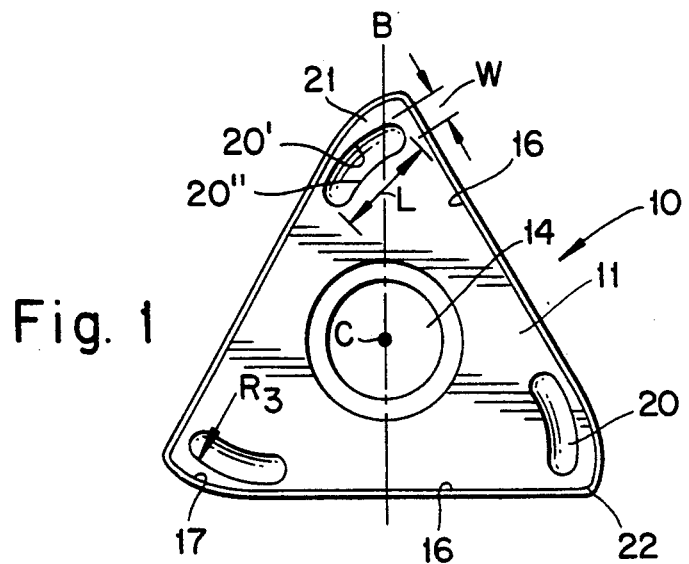
FIG. 1 is a top view of an insert according to the invention.

An insert according to the invention is shown in the figures. The insert comprises a polygonal body 10 of wear resistant material. The body includes an upper chip face 11 of substantially triangular form, an opposite bottom face 12 that is parallel with the chip face 11, and a clearance edge surface located between the faces 11, 12. The clearance edge surface includes side clearance faces 13 and curved corner clearance faces 18. The side clearance faces 13 are oriented perpendicularly in relation to faces 11 and 12. The insert body has a central aperture 14 which extends entirely through the insert body to receive a suitable clamping screw or lever arm of an associated toolholder 15. Side cutting edges 16 are defined by the intersection between faces 11 and 13. The corner clearance faces 18 intersect the upper chip face 11 to form corner cutting edges 17.

In accordance with the invention, each corner cutting edge 17 is curved as the insert is viewed in plan (FIG. 1). Also, the corner clearances faces 18 are convexly curved such that the major portion of the corner cutting edge 17 is located on one side of an imaginary line B which passes through the corner. That line B extends perpendicularly from the center of an opposite edge 16 and passes through the center C of the insert.

Each face 18 has a clearance angle α which increases progressively towards the cutting corner from an intersection line 19 formed by the intersection of faces 18 and 13. The angle α is zero at juncture line 19 and then increases along the edge 17 up to a value of 7° at the end of the edge 17.

Figure 2:
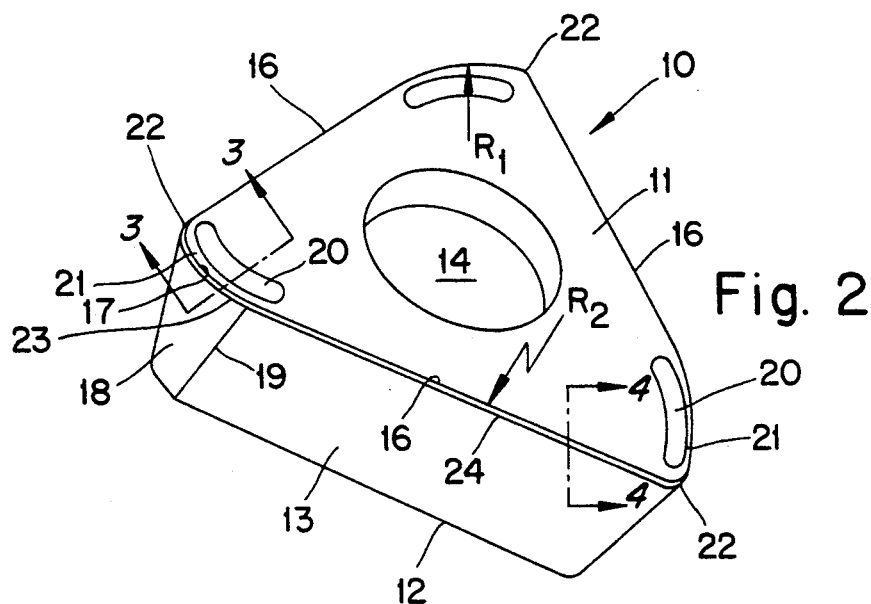
FIG. 2 is a perspective view of the insert of the invention.

As regards the curvature of the corner cutting edge 17, that curvature could be defined by a constant radius of curvature $R_1$ (see FIG. 2) or by a continuously variable radius whereby the degree of curvature of the corner cutting edge progressively increases from the line 19 to the corner.

The corner cutting edge 17 acts as a main cutting edge, whereas the side cutting edge 16 acts as a supporting edge in contact with the machined surface on a workpiece A. The chip face of the insert at the corner is provided with a smoothly curved recess 20 which is located at a distance from the cutting edge and is intended to act as a chipbreaker. This chipbreaker 20 is provided with a smaller radius of curvature $R_3$ than the radius $R_1$ of the corner cutting edge 17.

The recess 20 is curved as viewed in plan such that the near wall 20' thereof located closest to the corner 22 is concave as viewed in plan, and the far wall 20'' thereof located farthest from the corner is convex as viewed in plan. Thus, it will be appreciated that each of those walls 20', 20'' intersects the top surface 11 along an intersection line which is of concave-convex curvature as viewed in plan (i.e., as viewed in FIG. 1), and that each of those intersection lines has its convex side facing generally toward the adjacent corner cutting edge. The recess is elongated such that its length L directed generally parallel to the corner cutting edge is longer than its width W directed generally perpendicular to the corner cutting edge.

Figure 3:
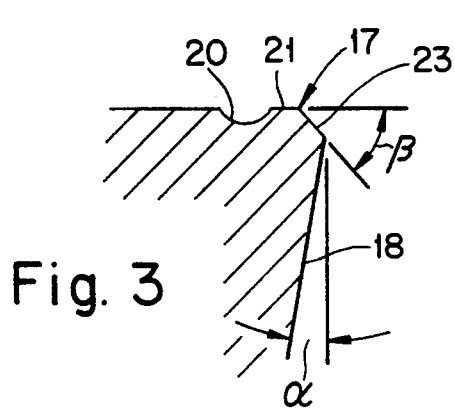
FIG. 3 is a cross-sectional view taken through the insert along the line 4—4 in FIG. 2.

As appears from FIG. 3, this chipbreaker recess 20 has a cross-sectional configuration in the form of a portion of a circular arc. A strengthening land area 21 is provided between the chipbreaker 20 and the corner cutting edge 17. That land has a width (shown in FIG. 3) which increases progressively towards the corner 22. This land strengthens the corner cutting edge, thus enabling higher feeds.

Figure 4:
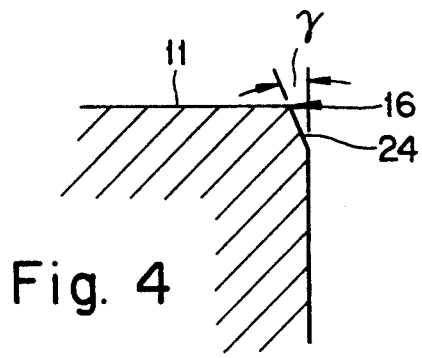
FIG. 4 is a cross-sectional view taken through the insert along the line 4—4 in FIG. 2.

Although the edge 16 could be straight, it is preferable that the edge 16 be convexly curved about a large radius of curvature $R_2$, which is larger than the radius $R_1$ of the corner cutting edge 17. That radius, like the radius $R_1$, would lie in the plane of the chip face 11. At the same time, it is advantageous to provide each corner clearance face 18 with a small strengthening beveled face 23 inclined at an angle β in relation to the chip face 11, preferably in the range 10°-20°. Further, it is suitable to provide each side clearance face 13 with a supporting beveled face 24, as shown in FIG. 4, which is suitably inclined at an angle γ relative to normal to the chip face 11, that angle γ being in the range of 3°-5°.

In order to be able to increase the feed, while maintaining good surface finish, the radius of curvature of cutting edge 17 can be made to progressively decrease from the intersection line 19 towards the corner 22.

Figure 5:
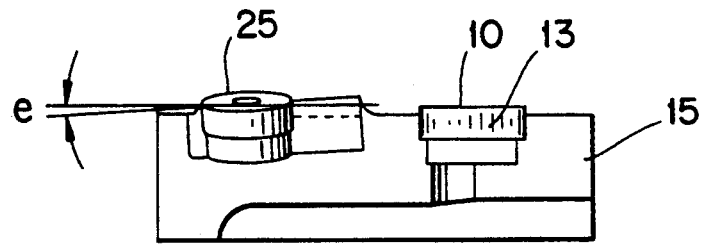
FIG. 5 is a side view of a toolholder equipped with an insert according to the invention.
Figure 6:
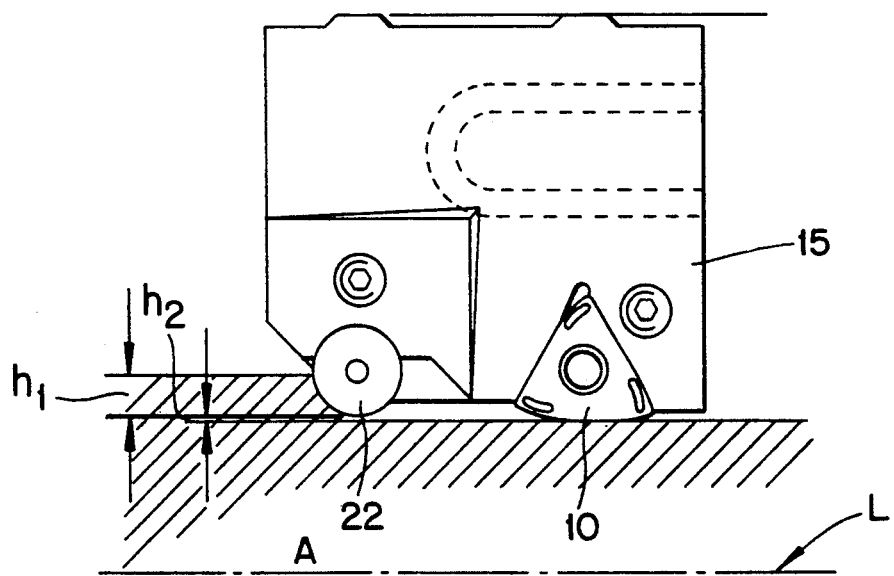
FIG. 6 is a top view of the toolholder shown in FIG. 5 as a workpiece is being cut.

As shown in FIGS. 5-6, the insert 10 is intended to be supported by a toolholder 15, which is secured to a rotating cutting head (not shown) That head rotates about an axis L which coincides with the axis of a non-rotatable workpiece A. A circularly shaped heavy duty insert 22 is also provided in the same toolholder 10 at some distance from the insert 10. In the alternative, one or several heavy duty inserts with a shape other than round could be arranged in combination with the insert 10.

The circularly shaped insert 22 is a roughing insert for performing roughing operations to a cutting depth $h_1$ in the workpiece A whereas the insert 10 is a finishing insert, which creates the final surface in workpiece A at a cutting depth $h_2$. The roughing insert 22 is inclined relative to the plane of the toolholder 15. That is, the roughing insert is inclined forwardly by angle e (FIG. 4) in that its front side (i.e., left side in FIG. 6) is lower than its rear side (right side in FIG. 6). The angle e is preferably in the range of 2°-4°. Also, the roughing insert 22 is inclined sidewardly in that its inner side (i.e., the side farthest from the workpiece axis L) is higher than its outer side (i.e., the side closest to the workpiece axis L); that inclination is also in the range of 2°-4°.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A cutting insert for bar peeling comprising a multi-cornered polygonal body of wear resistant material, said body including top and bottom surfaces and a peripheral edge surface extending therebetween, said peripheral edge surface including side clearance faces and corner clearance faces which intersect said top surface to form side and corner cutting edges, respectively, each corner cutting edge being convexly curved as said top surface is viewed in plan, said top surface defining a chip face and including chipbreaker recesses located adjacent respective ones of said corner cutting edges, each recess being spaced from its adjacent corner cutting edge in a direction toward a center of said insert, each of said recesses being curved and comprising a near wall and a far wall, said near wall located closer to said corner cutting edge than said far wall, each of said near and far walls intersecting said top surface along an intersection line which is of smooth and continuous concave-convex curvature as viewed in plan, each of said intersection lines having its convex side facing generally toward the adjacent corner cutting edge.

2. A cutting insert according to claim 1, wherein each of said corner clearance faces extends at an acute clearance angle relative to said top surface.

3. A cutting insert according to claim 1, wherein said clearance angle becomes progressively larger as a respective corner is approached.

4. A cutting insert according to claim 1, wherein said peripheral edge surface includes side clearance faces which intersect said top face to form therewith side cutting edges.

5. A cutting insert according to claim 4, wherein each of said side cutting edge being convex as viewed in plan and having a radius of curvature substantially larger than that of said corner cutting edges.

6. A cutting insert according to claim 1, wherein said body is generally triangular.

7. A cutting insert according to claim 1, wherein said curvature of said corner cutting edge is defined by a constant radius of curvature.

8. A cutting insert according to claim 1, wherein said curvature of said corner cutting edge varies so that the degree of curvature increases toward said corner.

9. A cutting insert according to claim 1, wherein said top face includes a land disposed between each of corner cutting edges and its respective recess, said land becoming wider as said corner is approached.

10. A cutting insert according to claim 4, wherein each of said side clearance faces includes a bevel intersecting a respective side cutting edge, said bevel forming an angle with a line normal to said chip face, said angle being in the range of about 3 to 5 degrees.

11. A cutting insert according to claim 1, wherein each of said corner clearance faces includes a bevel intersecting a respective corner cutting edge at an angle in the range of 10 to 20 degrees.

12. A cutting insert according to claim 4, wherein an imaginary line extending perpendicularly from a side cutting edge and passing through a geometric center of said insert intersects a respective one of said corner cutting edges such that a portion of said corner cutting edge disposed on one side of said line is longer than the remainder thereof located on the other side of said line.

13. A cutting insert for bar peeling comprising a multi-cornered polygonal body of wear resistant material, said body including top and bottom surfaces and a peripheral edge surface extending therebetween, said peripheral edge surface including corner clearance faces disposed at respective corners of said body, said corner clearance faces intersecting said top surface to form corner cutting edges, each corner cutting edge being convexly curved as said top surface is viewed in plan, said top surface defining a chip face and including chipbreaker recesses located adjacent respective ones of said corner cutting edges, each recess being spaced from its respective corner cutting edge in a direction toward a center of said insert, each of said recesses being curved and comprised of a near wall and a far wall, said near wall located closer to said corner cutting edge than said far wall, each of said near and far walls intersecting said top surface along an intersection line which is of concave-convex curvature as viewed in plan, each of said intersection lines having its convex side facing generally toward said corner cutting edge, each of said corner clearance faces extending at an acute angle relative to said top surface, said clearance angle becoming progressively larger as a respective corner is approached.

14. A cutting insert for bar peeling comprising a multi-cornered polygonal body of wear resistant material, said body including top and bottom surfaces and a peripheral edge surface extending therebetween, said peripheral edge surface including corner clearance faces disposed at respective corners of said body, said corner clearance faces intersecting said top surface to form corner cutting edges, each corner cutting edge being convexly curved as said top surface is viewed in plan, said top surface defining a chip face and including chipbreaker recesses located adjacent respective ones of said corner cutting edges, each recess being spaced from its respective corner cutting edge in a direction toward a center of said insert, each of said recesses being curved and comprised of a near wall and a far wall, said near wall located closer to said corner cutting edge than said far wall, each of said near and far walls intersecting said top surface along an intersection line which is of concave-convex curvature as viewed in plan, each of said intersection lines having its convex side facing generally toward said corner cutting edge, said peripheral edge surface including side clearance faces which intersect said top face to form therewith said cutting edges, each of said side cutting edges being convex as viewed in plan and having a radius of curvature substantially larger than that of said corner cutting edges.

15. A cutting insert for bar peeling comprising a multi-cornered polygonal body of wear resistant material, said body including top and bottom surfaces and a peripheral edge surface extending therebetween, said peripheral edge surface including corner clearance faces disposed at respective corners of said body, said corner clearance faces intersecting said top surface to form corner cutting edges, each corner cutting edge being convexly curved as said top surface is viewed in plan, said top surface defining a chip face and including chipbreaker recesses located adjacent respective ones of said corner cutting edges, each recess being spaced from its respective corner cutting edge in a direction toward a center of said insert, each of said recesses being curved and comprised of a near wall and a far wall, said near wall located closer to said corner cutting edge than said far wall, each of said near and far walls intersecting said top surface along an intersection line which is of concave-convex curvature as viewed in plan, each of said intersection lines having its convex side facing generally toward said corner cutting edge, wherein said curvature of said corner cutting edge varies so that the degree of curvature increases toward said corner.

16. A cutting insert for bar peeling comprising a multi-cornered polygonal body of wear resistant material, said body including top and bottom surfaces and a peripheral edge surface extending therebetween, said peripheral edge surface including corner clearance faces disposed at respective corners of said body, said corner clearance faces intersecting said top surface to form corner cutting edges, each corner cutting edge being convexly curved as said top surface is viewed in plan, said top surface defining a chip face and including chipbreaker recesses located adjacent respective ones of said corner cutting edges, each recess being spaced from its respective corner cutting edge in a direction toward a center of said insert, each of said recesses being curved and comprised of a near wall and a far wall, said near wall located closer to said corner cutting edge than said far wall, each of said near and far walls intersecting said top surface along an intersection line which is of concave-convex curvature as viewed in plan, each of said intersection lines having its convex side facing generally toward said corner cutting edge, wherein said top face includes a land disposed between each of corner cutting edges and its respective recess, said land becoming wider as said corner is approached.

17. A cutting insert for bar peeling comprising a multi-cornered polygonal body of wear resistant material, said body including top and bottom surfaces and a peripheral edge surface extending therebetween, said peripheral edge surface including corner clearance faces disposed at respective corners of said body, said corner clearance faces intersecting said top surface to form corner cutting edges, each corner cutting edge being convexly curved as said top surface is viewed in plan, said top surface defining a chip face and including chipbreaker recesses located adjacent respective ones of said corner cutting edges, each recess being spaced from its respective corner cutting edge in a direction toward a center of said insert, each of said recesses being curved and comprised of a near wall and a far wall, said near wall located closer to said corner cutting edge than said far wall, each of said near and far walls intersecting said top surface along an intersection line which is of concave-convex curvature as viewed in plan, each of said intersection lines having its convex side facing generally toward said corner cutting edge, said peripheral edge surface including side clearance faces which intersect said top face to form therewith side cutting edges, wherein each of said side clearance faces includes a bevel intersecting a respective side cutting edge, said bevel forming an angle with a line normal to sid chip face, said angle being in the range of about 3 to 5 degrees.

18. A cutting insert for bar peeling comprising a multi-cornered polygonal body of wear resistant material, said body including top and bottom surfaces and a peripheral edge surface extending therebetween, said peripheral edge surface including corner clearance faces disposed at respective corners of said body, said corner clearance faces intersecting said top surface to form corner cutting edges, each corner cutting edge being convexly curved as said top surface is viewed in plan, said top surface defining a chip face and including chipbreaker recesses located adjacent respective ones of said corner cutting edges, each recess being spaced from its respective corner cutting edge in a direction toward a center of said insert, each of said recesses being curved and comprised of a near wall and a far wall, said near wall located closer to said corner cutting edge than said far wall, each of said near and far walls intersecting said top surface along an intersection line which is of concave-convex curvature as viewed in plan, each of said intersection lines having its convex side facing generally toward said corner cutting edge, wherein each of said corner clearance faces includes a bevel intersecting a respective corner cutting edge at an angle in the range of 10 to 20 degrees.

19. A cutting insert for bar peeling comprising a multi-cornered polygonal body of wear resistant material, said body including top and bottom surfaces and a peripheral edge surface extending therebetween, said peripheral edge surface including corner clearance faces disposed at respective corners of said body, said corner clearance faces intersecting said top surface to form corner cutting edges, each corner cutting edge being convexly curved as said top surface is viewed in plan, said top surface defining a chip face and including chipbreaker recesses located adjacent respective ones of said corner cutting edges, each recess being spaced from its respective corner cutting edge in a direction toward a center of said insert, each of said recesses being curved and comprised of a near wall and a far wall, said near wall located closer to said corner cutting edge than said far wall, each of said near and far walls intersecting said top surface along an intersection line which is of concave-convex curvature as viewed in plan, each of said intersection lines having its convex side facing generally toward said corner cutting edge, said peripheral edge surface including side clearance faces which intersect said top face to form therewith side cutting edges, wherein an imaginary line extending perpendicularly from a side cutting edge and passing through a geometric center of said insert intersects a respective one of said corner cutting edges such that a portion of said corner cutting edge disposed on one side of said imaginary line is longer than the remainder thereof located on the other side of said imaginary line.

20. A tool for bar peeling comprising a toolholder on which are removably disposed a circular roughing insert and a finishing insert, said finishing insert being substantially triangular shaped with a curved corner cutting edge in each corner thereof, said finishing insert including a top face and a peripheral edge face which includes a side clearance face and a corner clearance face which intersect said top face to form a side cutting edge and a corner cutting edge, respectively; said corner clearance face, at a junction with said side clearance face, forming a zero degree clearance angle relative to a plane extending perpendicular to said top face, said clearance angle progressively increasing from said junction to a respective corner of said insert.

21. A tool according to claim 20, wherein said finishing insert lies within the plane of said toolholder, and said roughing insert is inclined at an angle of from 2 to 4 degrees relative to said plane.

22. A tool according to claim 20, wherein an imaginary line extending perpendicularly from one of said side cutting edges and passing through a geometric center of said insert intersects a corner cutting edge such that a portion of said corner cutting edge located on one side of said line is longer than a remainder of said corner cutting edge located on another side of said line.

23. A tool according to claim 20, wherein said roughing insert is arranged to make a deeper cut than said finishing insert.

* * * * *